United States Patent
Abou-El-Ella et al.

(10) Patent No.: US 8,423,012 B1
(45) Date of Patent: Apr. 16, 2013

(54) MOBILE DEVICE DIAGNOSTIC AND REMEDIATION

(75) Inventors: Hassan Abou-El-Ella, Overland Park, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 210 days.

(21) Appl. No.: 12/957,309

(22) Filed: Nov. 30, 2010

(51) Int. Cl.
*H04W 24/00* (2009.01)

(52) U.S. Cl.
USPC ......... 455/423; 455/425; 455/419; 455/432.1

(58) Field of Classification Search .................. 455/423, 455/425, 419, 432.1
See application file for complete search history.

(56) References Cited

U.S. PATENT DOCUMENTS

| | | | |
|---|---|---|---|
| 7,539,733 B2 * | 5/2009 | Mohammed et al. | 709/208 |
| 2008/0040452 A1 * | 2/2008 | Rao et al. | 709/219 |
| 2009/0281819 A1 * | 11/2009 | Garg | 705/1 |
| 2010/0325216 A1 * | 12/2010 | Singh et al. | 709/206 |
| 2012/0023419 A1 * | 1/2012 | Kannan et al. | 715/758 |
| 2012/0079100 A1 * | 3/2012 | McIntyre et al. | 709/224 |

* cited by examiner

*Primary Examiner* — Barry Taylor (57) ABSTRACT

A portable electronic device is provided. The device comprises a radio transceiver, a processor, a memory, and an application stored in the memory. When executed by the processor, the application sends a chat message via the radio transceiver identifying a problem of the device. The application further receives a request for one of a version identity of a preferred roaming list (PRL) stored on the device, an identity of a firmware version installed on the device, an identity of the device model, and a mobile equipment identity (MEID) of the device. The application further transmits one of the version identity of the preferred roaming list (PRL) stored on the device, the identity of the firmware version installed on the device, the identity of the device model, and the mobile equipment identity (MEID) of the device via the radio transceiver.

20 Claims, 5 Drawing Sheets

MOBILE DEVICE DIAGNOSTIC AND REMEDIATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. In addition to the standard voice function of a mobile telephone, current mobile phones and other similar portable electronic devices may support additional services including short message service (SMS) for text messaging, electronic mail, and packet switching for access to the Internet. When a problem occurs with a mobile telephone, resolving the problem may rely on the user working with a customer care organization of the communication service provider. The user may provide information and manually troubleshoot the problem themselves based on directions given by the customer care agent. Alternatively the user may drive to a local retail location to receive service.

SUMMARY

In an embodiment, a portable electronic device is disclosed. The device comprises a radio transceiver, a processor, a memory, and an application stored in memory. When executed by the processor, the application sends a chat message via the radio transceiver identifying a problem of the device. The application further receives a request for one of a version identity of a preferred roaming list (PRL) stored on the device, an identity of a firmware version installed on the device, an identity of the device model, and a mobile equipment identity (MEID) of the device. The application further transmits one of the version identity of the preferred roaming list (PRL) stored on the device, the identity of the firmware version installed on the device, the identity of the device model, and the mobile equipment identity (MEID) of the device via the radio transceiver. Based on the received information, the application sends a first command to the portable electronic device to fix the problem of the portable electronic device.

In an embodiment, a system is disclosed. The system is comprised of a processor, a memory, and an application stored in memory. When executed by the processor, the application receives a first chat message identifying a problem of a portable electronic device. In response to the first chat message, the application sends a request for information to the portable electronic device, wherein the requested information comprises at least one of a version identity of a preferred roaming list stored on the portable electronic device, an identity of a firmware version installed on the portable electronic device, an identity of the portable electronic device model, and a mobile equipment identity of the portable electronic device, receives information from the portable electronic device, wherein the received information comprises at least one of the version identity of the preferred roaming list stored on the portable electronic device, the identity of the firmware version installed on the portable electronic device, the identity of the portable electronic device model, and the mobile equipment identity of the portable electronic device via the radio transceiver. Based on the received information, the application sends a first command to the portable electronic device to fix the problem of the portable electronic device.

In an embodiment, a method of communication is disclosed. The method comprises receiving a first chat message identifying a portable electronic device and a problem of the portable electronic device and requesting information from the portable electronic device, wherein the requested information comprises at least one of a version identity of a preferred roaming list stored on the portable electronic device, an identity of a firmware version installed on the portable electronic device, an identity of the portable electronic device model, and a mobile equipment identity of the portable electronic device. the method further comprises receiving information from the portable electronic device, wherein the received information comprises at least one of the version identity of the preferred roaming list stored on the portable electronic device, the identity of the firmware version installed on the portable electronic device, the identity of the portable electronic device model, and the mobile equipment identity of the portable electronic device via the radio transceiver. The method further comprises, based on the received information, sending a first command to the portable electronic device to fix the problem of the portable electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for enhanced interaction between a portable electronic device user and a customer care agent utilizing chat messages is described. A portable electronic device experiencing a problem is equipped with an application that initiates a chat session with customer care for purposes of identifying and resolving the issue. In response to the first chat message, the customer care system sends a request for information to the portable electronic device for the purpose of identifying details about the hardware and software on the device. The application on the portable electronic device would reply with the requested information. This transfer of information between the device and the customer care system could occur on a secondary communication channel, or utilize the same channel but be hidden from the device user. Based on the information received, the customer care system sends a first command to the portable electronic device to fix the problem. The client application may execute on a mobile phone, a personal digital assistant (PDA), a media player, or other communication enabled portable electronic device.

As used herein, the term "chat," "chat session," and/or "chat message" refers to message based communication that does not depend upon having a dedicated continuous communication link. For example, typically voice communication between two parties would depend upon having a dedicated continuous communication link. Likewise, some applications may depend upon a continuous data communication session to be maintained throughout the duration of application execution. In contrast a chat session, as used in this disclosure, may comprise one or more message exchanges, typically data message exchanges, that do not rely upon maintenance of a continuous communication link or communication session between the exchanges of the messages.

In an embodiment, the client application on the portable electronic device may chat with customer care and respond to remote access commands from a server on the customer care system. The initial chat message may present the identity of the version of the preferred roaming list (PRL) installed, the firmware version installed, the mobile equipment identity (MEID), and model of the device: the baseline information that customer care will require to troubleshoot known device issues. The client application may save a history of all communications with customer care to be retrieved and provided during future chat sessions. In the case of a portable electronic device that has limited processing capability, for example a low-cost mobile phone that may not support simultaneous voice and data communication, the system promotes alternating between voice communication, for example a mobile phone user describing an initial problem and/or a result observed after a corrective action has been taken, and data communications related to the customer care issue, for example reading diagnostic information from and/or transmitting commands to the portable electronic device.

The server application on the customer care system may utilize the increasing processing power of the portable electronic device to diagnose the problem, deliver a solution, and validate the solution. For example, remote commands may be sent to the portable electronic device to request a list of running applications, to shut down a running application, to request authority to execute commands on the device, to turn off a hardware device on the portable electronic device such as Wi-Fi or Bluetooth radios, or to execute a firmware or preferred roaming list update. Additionally, commands may be sent to allow the customer care agent to walk the user through the steps of performing a task to teach use of their device. The server application also may save a history of the communication, including chat history, command history, and device settings and responses. This persistent information then may be used to connect the user to the former customer care agent to continue troubleshooting, or to provide a new customer care agent with the data needed to quickly get up to speed on issues with the device.

Figure 1:
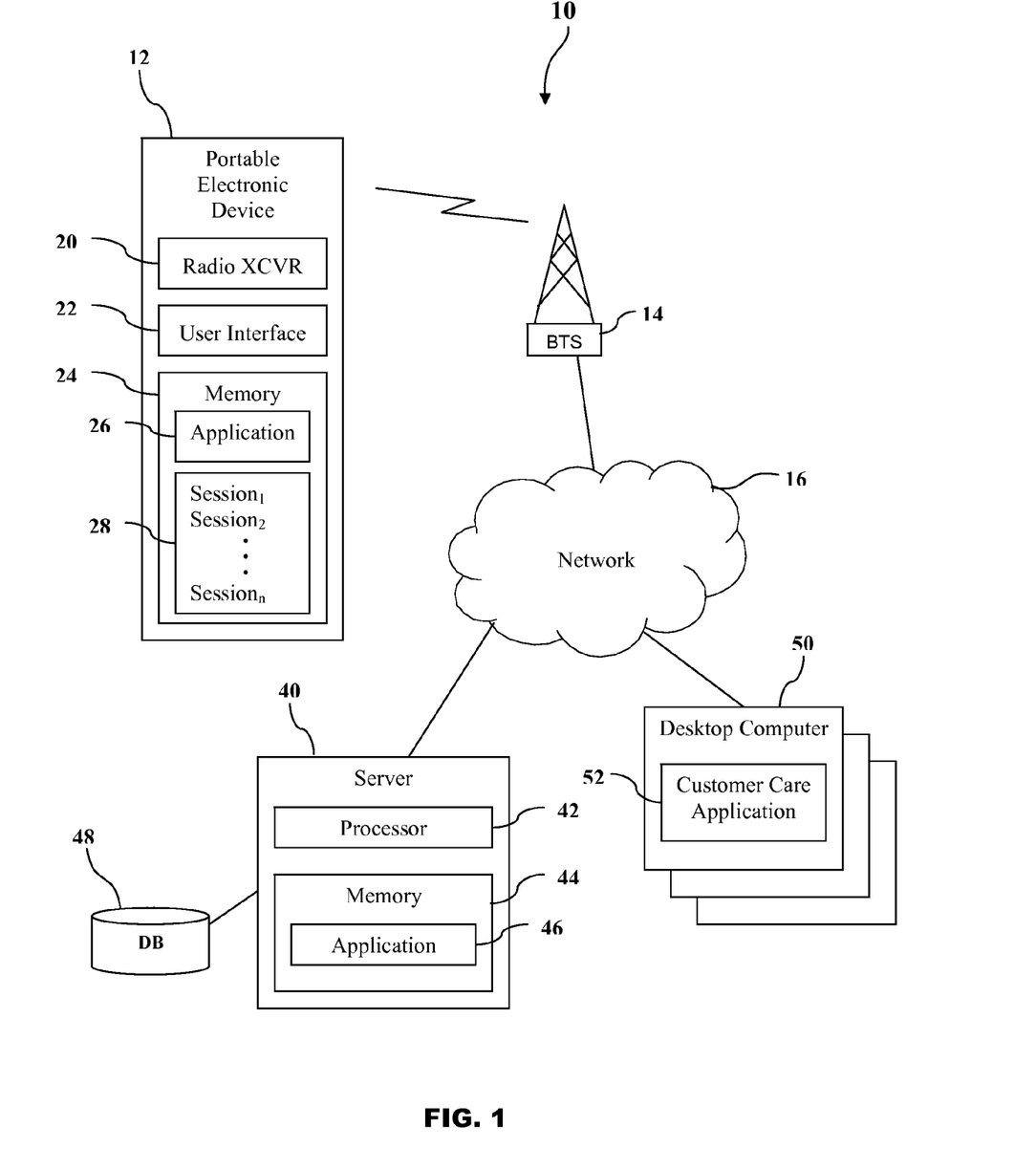
FIG. 1 is a block diagram of a communication system according to an embodiment of the disclosure.

Turning now to FIG. 1, a communication system 10 is described. The system 10 comprises a portable electronic device 12, a base transceiver station (BTS) 14, a network 16, and a server 40. The portable electronic device 12 may be a mobile phone, a personal digital assistant (PDA), a media player, or other communication enabled portable electronic device. The base transceiver station 14 provides a communication link to the device 12 and couples the device 12 to the network 16. In an embodiment, the base transceiver station 14 provides a wireless communication link to the portable electronic device 12 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 14 is illustrated in FIG. 1, it is understood that the communication system 10 may comprise any number of base transceiver stations 14 and any number of portable electronic devices 12. The network 16 may be a public communication network, a private communication network, or a combination thereof.

The portable electronic device 12 may comprise a radio transceiver 20, a first user interface 22, and a first memory 24. Alternatively, the portable electronic device 12 may comprise two or more radio transceivers 20. The first memory 24 may store a first context application 26 and a first data store 28 comprising of stored session data and/or stored chat messages from communications with customer care. The first context application 26 may access the stored session data and send the data to customer care in subsequent chat sessions. It is understood that the expression "chat session" does not require a continuous communication link and that a "chat session" may comprise a sequence of messages that are associated with each other by virtue of having been transmitted pursuant to a unified and/or single initiating customer care communication or request. Chat messages may be transmitted using a variety of known communication mechanisms, including but not limited to short message service (SMS) messages, multimedia message service (MMS) messages, instant messaging (IM) messages, email messages, and other message communication mechanisms.

The first context application 26 is executed by a processor (not shown) of the portable electronic device 12. When a user experiences a problem with the portable electronic device 12, the user may execute the first context application 26 to initiate a chat with customer care. In an embodiment, the first context application 26 may send a chat message via a first communication channel over the radio transceiver 20 identifying a problem with the portable electronic device 12. The radio transceiver 20 transmits the wireless communication to the base transceiver station 14, which in turn transmits the message via the network 16 to the server 40. The portable electronic device 12 may receive a request from server 40 for one of the version identity of the preferred roaming list stored in first memory 24, an identity of the firmware version installed on the portable electronic device 12, an identity of the portable electronic device 12 model, and the mobile equipment identity of the portable electronic device 12. In response to receiving the request, the first context application 26 may transmit one of the version identity of the preferred roaming list stored in first memory 24, an identity of a firmware version installed on the portable electronic device 12, an identity of the portable electronic device 12 model, and a mobile equipment identity of the portable electronic device 12 via the radio transceiver 20.

The communication in both directions may utilize the first communication channel established at startup of the first context application 26. The customer care agent may chat with the user, with the chat messages presented to the user interface 22. The first context application 26 may receive a command via the radio transceiver 20 using the first communication channel to change configuration on the portable electronic device 12, for example to fix the problem experienced by the user. Alternatively, in another embodiment, the first context application 26 may send the chat message via a first communication channel and then establish a second communication channel and receive a command via the radio transceiver 20 to change configuration on the portable electronic device 12. The portable electronic device 12 may include multiple radio transceivers, and the second communication channel may utilize a second radio transceiver. The information and commands sent and received may occur in the background over either the first or second communication channel without ever being presented to the user interface 22 by the first context application 26. This may allow the customer care agent to troubleshoot the portable electronic device while continuing to interact with the user through the chat session over the first communication channel, allowing the solution to be reached more quickly and providing a better service experience to the user.

The first communication channel may be a wireless communication channel that promotes voice communication and/or data communication. The second communication channel may be a wireless communication channel that promotes data communication. The first communication channel and the second communication channel may be based on the same wireless protocol, for example one of the wireless protocols identified above. Alternatively, the first communication channel may be provided according to a first wireless protocol and the second communication channel may be provided according to a second wireless communication protocol, wherein the first wireless communication protocol is different from the second wireless communication protocol. For example, the first wireless communication protocol may be GSM and the second wireless communication protocol may be WiFi. In another embodiment, the first communication channel may be coupled to a first device, for example a desktop computer, a laptop computer, a desktop phone, or a portable electronic device different from the portable electronic device 12 and the second communication channel may be coupled to the portable electronic device 12. In this case, the problem may be identified to the customer care application 52 via the first communication channel, for example when the portable electronic device 12 may not be able to originate communication or is operating in a diminished capacity, and the server 40 may establish the second communication link with the portable electronic device 12 to read diagnostic information and/or to send commands to the portable electronic device 12.

In an embodiment, the first context application 26 may receive a request via the radio transceiver 20 for a list of applications executing on the portable electronic device 12. This list of running applications may be used for troubleshooting purposes by customer care to help identify and resolve the problem of the portable electronic device 12. In response to this request, the first context application 26 may transmit the list of applications executing on the portable electronic device 12 via the radio transceiver 20. In another case, the first context application 26 may receive a request to turn off at least one hardware device of the portable electronic device. Similar to the previous example, this action may be requested as a troubleshooting step to ensure a hardware failure is not the cause of the problem being experienced by the portable electronic device 12. The first context application may respond to the request by turning off the at least one hardware device of the portable electronic device 12.

In an embodiment, the first context application 26 may receive a request from the server 40 for authority to remotely execute commands on the portable electronic device. In response to the request, the first context application 26 may transmit authority to remotely execute commands on the portable electronic device 12 to the server 40 via the radio transceiver 20. Prior to transmitting authority to the server 40, the first context application 26 may present a means for the user to agree to allow remote access through the user interface 22. For example, the first context application 26 may present a window to the user with a check box to allow remote access and record the selection of the user before granting authority to the server 40. Alternatively, the first context application 26 may present a method for the user to agree to grant remote access authority upon startup of the first context application 26. This could explicitly grant necessary authority to the customer care agent for the purpose of troubleshooting the portable electronic device problem for the duration of the specific chat session, possibly allowing the customer care agent to more quickly resolve the issue.

In addition to the first context application 26 running on the portable electronic device 12, the present disclosure also teaches a server 40 executing some of the processing through a second context application 46 and providing the communication to the customer care agent. The second context application 46 may provide an interface over the network 16 to a plurality of agents executing a customer care application 52 on their desktop computers 50. The customer care application 52 may provide the customer care agent the interface to view and respond to chat messages received by the second context application 46 from a portable electronic device 12 user. The customer care application 52 also may allow the customer care agent to direct the second context application 46 on the server 40 to send and execute commands on the portable electronic device 12 for the purpose of troubleshooting and resolving an issue on the device 12. The server 40 may be coupled to a data store 48 that may store session information and details about the portable electronic device 12 obtained during the troubleshooting session.

The second context application 46 is executed by a processor 42 of the server 40. When a user experiences a problem with the portable electronic device 12, the user may execute the first context application 26 to initiate a chat with customer care. In an embodiment, the second context application 46 may receive a first chat message over the network 16 identifying a problem with a portable electronic device 12. In response to receiving the first chat message, the second context application 46 may send a request for information from the portable electronic device 12, wherein the requested information comprises at least one of the version identity of the preferred roaming list stored in first memory 24, an identity of the firmware version installed on the portable electronic device 12, an identity of the portable electronic device 12 model, and the mobile equipment identity of the portable electronic device 12.

In response to receiving the information from a portable electronic device 12, wherein the information received comprises at least one of the version identity of the preferred roaming list stored in first memory 24, an identity of a firmware version installed on the portable electronic device 12, an identity of the portable electronic device 12 model, and a mobile equipment identity of the portable electronic device 12 via the radio transceiver 20, and based on the received information, the second context application 46 may send a first command to the portable electronic device 12 to fix the problem of the portable electronic device 12. In an embodiment, the second context application 46 may store the first chat message, the information received from the portable electronic device 12, and the first command sent to the portable electronic device 12 in second memory 44 or in data store 48. This persistent data will allow the second context application 46 to bootstrap communication back to a former customer care agent to continue a troubleshooting session, as well as retaining actions already attempted to resolve the issue.

For example, a user may initiate a first chat session to report a problem with the portable electronic device 12. Upon receiving the information from the portable electronic device 12, the second context application 46 identifies that the firmware installed on the portable electronic device 12 is not the correct version and sends a command to the portable electronic device 12 to update the firmware. The customer care agent then may use the chat interface to notify the user of the incorrect firmware and of the steps that have been taken to correct the problem. Additionally, the customer care agent may direct the user to verify if the problem is fixed upon completion of the firmware update and to start a second chat session with customer care if there is still an issue. The customer care agent will then be free to take another case while the portable electronic device 12 is performing the firmware update and the user is verifying the result of the update. In the case where there is still a problem following the firmware update and the user initiates a second chat session, the second context application 46, upon receiving the request for the second chat session, may search the second memory 44 or data store 48 for the saved information from the first chat session. This saved information then may be used to identify steps already taken for the purpose of continuing the troubleshooting and more quickly resolving the issue. The saved chat information from the first chat session also may be used to connect the user to the same customer care agent for the second chat session.

In an embodiment, the second context application 46, after sending the command to the portable electronic device 12 to fix the problem, may send a request to the portable electronic device 12 for data and validate that the problem has been fixed. For example, if the problem was identified to be related to an outdated version of the preferred roaming list on the portable electronic device 12, upon sending the command to initiate an update of the preferred roaming list and completion of the update, the second context application 46 may then request the version identity of the preferred roaming list again and validate that the current version now resides in the first memory 24.

The second context application 46, in the course of troubleshooting the portable electronic device 12, may determine that it needs to remotely execute commands on the device 12. In this case, the second context application 46 may send a request to the portable electronic device 12 for authorization to remotely execute commands on the device. Upon receiving authorization, the second context application 46 may execute a remote command on the portable electronic device 12 to turn off a hardware device. Additionally, or alternatively, the second context application 46 may execute a remote command on the portable electronic device 12 to shut down a currently running application. In this manner, the customer care agent, through the server and system described, may have the ability to react to either a hardware or software issue affecting the portable electronic device 12, and to take steps towards the goal of an actionable remedy to the problem.

In an embodiment, the second context application 46 may be used to send a plurality of requests to the portable electronic device 12 to display messages to lead a user of the portable electronic device 12 through a sequence of corrective actions. This capability also might be used by a customer care agent to walk a user through steps to teach use of a function of the portable electronic device 12.

Figure 2:
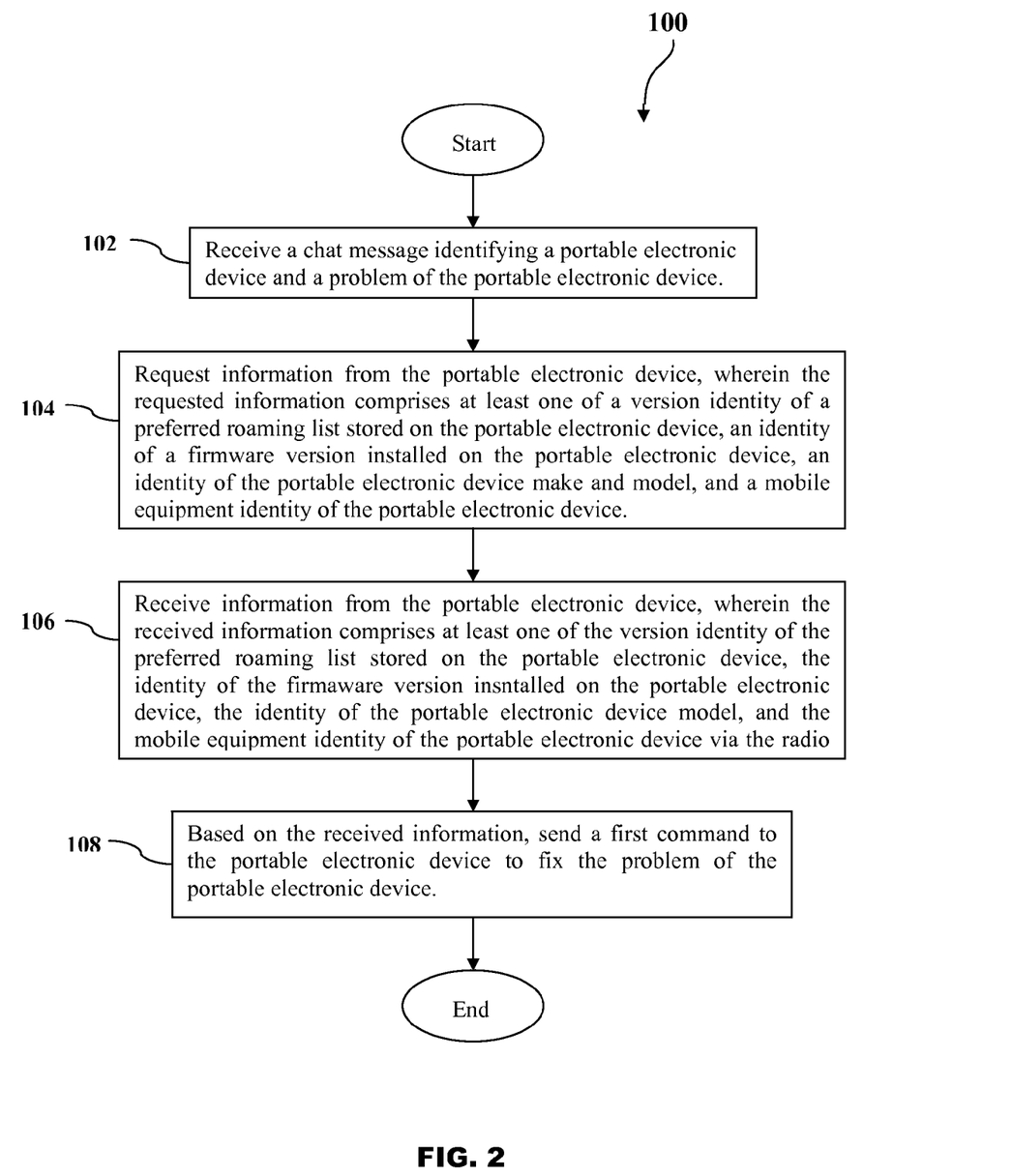
FIG. 2 is a flow chart of a method according to an embodiment of the disclosure.

Turning now to FIG. 2, a method 100 is described. At block 102, a chat message is received. This first chat message may identify the portable electronic device 12 and detail a problem of the portable electronic device 12. At block 104, information is requested from the portable electronic device 12 for the purpose of troubleshooting the problem identified. For example, basic information about the current configuration of the portable electronic device 12, including one or more of a version identity of a preferred roaming list stored on the portable electronic device 12, an identity of a firmware version installed on the portable electronic device 12, an identity of the make and model of the portable electronic device 12, and a mobile equipment identity of the portable device 12, may be enough to identify the problem cause.

At block 106, information is received from the portable electronic device 12 via the radio transceiver. The received information may be expected to be comprised of the basic information requested, including at least one of the version identity of the preferred roaming list stored on the device, the identity of the firmware version installed on the device 12, the identity of the device 12 model, and the mobile equipment identity of the portable electronic device 12. The received information may be checked against an expected configuration, for example, to verify the latest firmware and preferred roaming list are on the device 12.

Based on the information received, at block 108 a first command is sent to the portable electronic device 12 to fix the problem of the device 12. In an embodiment, the first command sent to the device 12 comprises at least one of sending a firmware update and sending a preferred roaming list update to the portable electronic device 12. In an embodiment, the method 100 may further comprise validating the fix performed. More specifically, after sending the first command to fix the device 12, the method 100 may comprise requesting validation data from the device 12, receiving the validation data from the portable electronic device 12, and based on the validation data, verifying the correction of the problem of the device 12. For example, if the fix was to update the firmware version of the device 12, following the update, the method 100 may request the current identity of the firmware version and verify that the firmware version has been updated and is current with the latest expected version for that device model.

In an embodiment, the method 100 may further comprise storing the first chat message received from the portable electronic device 12, storing the information received from the device 12, and storing the first command sent to the device 12. Another embodiment might extend the method 100 to also comprise receiving a second chat message identifying the portable electronic device 12 and a problem of the device 12, requesting additional information from the device 12, and receiving the additional information from the device 12. Based on this additional information, also based on the stored information from the previous session, including the stored first chat message, information, and first command, send a second command to the portable electronic device 12 to fix the problem of the device 12. In this manner, the method would be able to have access to and utilize results from previous chat sessions to facilitate resolving a new or ongoing problem.

Figure 3:
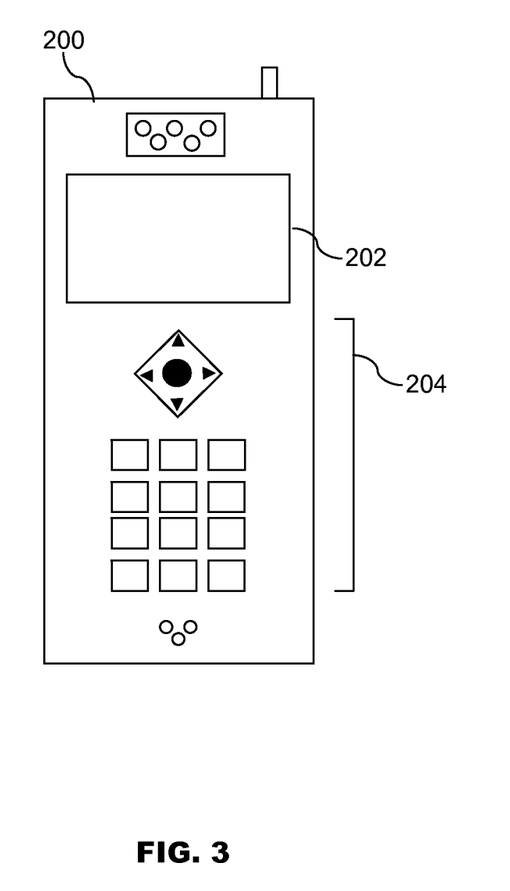
FIG. 3 is an illustration of a mobile device according to an embodiment of the disclosure.

FIG. 3 shows a mobile device 200. FIG. 3 depicts the mobile device 200, which is operable for implementing aspects of the present disclosure, for example the portable electronic device 12, but the present disclosure should not be limited to these implementations. Though illustrated as a mobile phone, the mobile device 200 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 200 is not a general purpose computing device like a portable, laptop or tablet computer, but rather is a special-purpose communications device such as a mobile phone, wireless handset, pager, or PDA. The mobile device 200 may support specialized activities such as gaming, inventory control, job control, and/or task management functions, and so on.

The mobile device 200 includes a display 202 and a touch-sensitive surface and/or keys 204 for input by a user. The mobile device 200 may present options for the user to select, controls for the user to actuate, and/or cursors or other indicators for the user to direct. The mobile device 200 may further accept data entry from the user, including numbers to dial or various parameter values for configuring the operation of the handset. The mobile device 200 may further execute one or more software or firmware applications in response to user commands. These applications may configure the mobile device 200 to perform various customized functions in response to user interaction.

Additionally, the mobile device 200 may be programmed and/or configured over-the-air, for example from a wireless base station, a wireless access point, or a peer mobile device 200.

Figure 4:
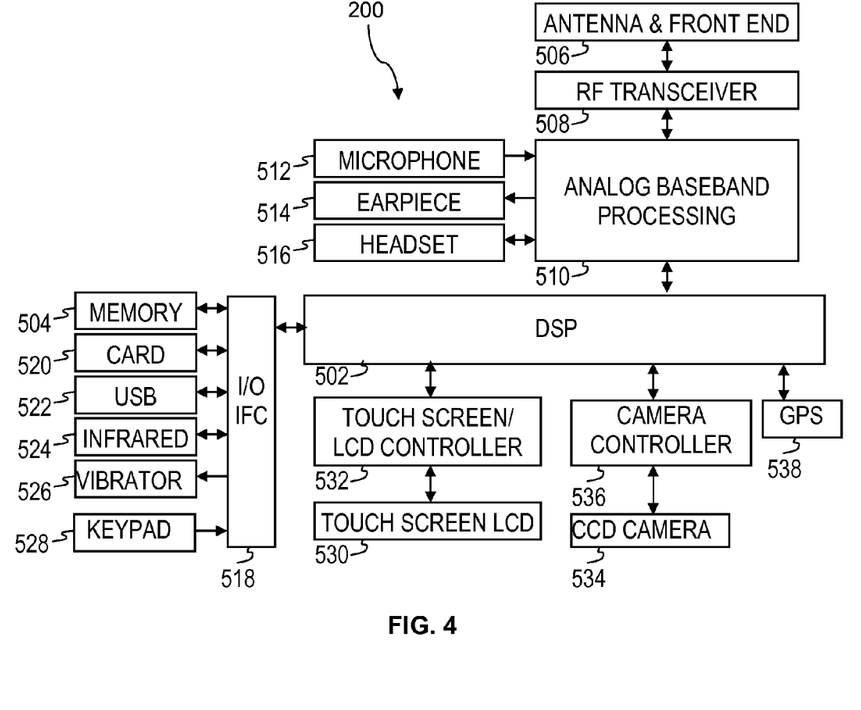
FIG. 4 is a block diagram of a mobile device according to an embodiment of the disclosure.

FIG. 4 shows a block diagram of the mobile device 200. While a variety of known components of handsets 200 are depicted, in an embodiment a subset of the listed components and/or additional components not listed may be included in the mobile device 200. The mobile device 200 includes a digital signal processor (DSP) 502 and a memory 504. As shown, the mobile device 200 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 200 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 200 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 200 to send and receive information from a radio access network (RAN) or some other available wireless communications network or from a peer mobile device 200. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 200 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 200 to function as a peripheral device to exchange information with a personal computer or other computer system. The infrared port 524 and other optional ports such as a Bluetooth interface or an IEEE 802.11 compliant wireless interface may enable the mobile device 200 to communicate wirelessly with other nearby handsets and/or wireless base stations.

The input/output interface 518 may further connect the DSP 502 to the vibrator 526 that, when triggered, causes the mobile device 200 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 200. Another input mechanism may be the touch screen LCD 530, which may also display text and/or graphics to the user. The touch screen LCD controller 532 couples the DSP 502 to the touch screen LCD 530.

The CCD camera 534 enables the mobile device 200 to take digital pictures. The DSP 502 communicates with the CCD camera 534 via the camera controller 536. The GPS sensor 538 is coupled to the DSP 502 to decode global positioning system signals, thereby enabling the mobile device 200 to determine its position. In another embodiment, a camera operating according to a technology other than charge coupled device cameras may be employed. Various other peripherals may also be included to provide additional functions, e.g., radio and television reception.

Figure 5:
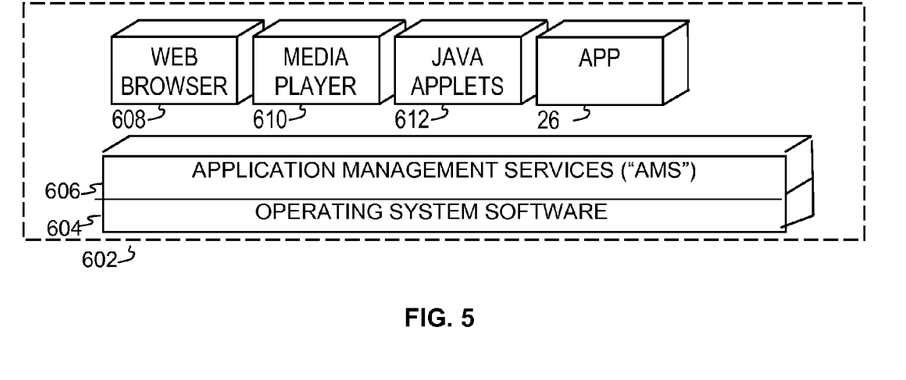
FIG. 5 is a block diagram of a software architecture for a mobile device according to an embodiment of the disclosure.
Figure 6:
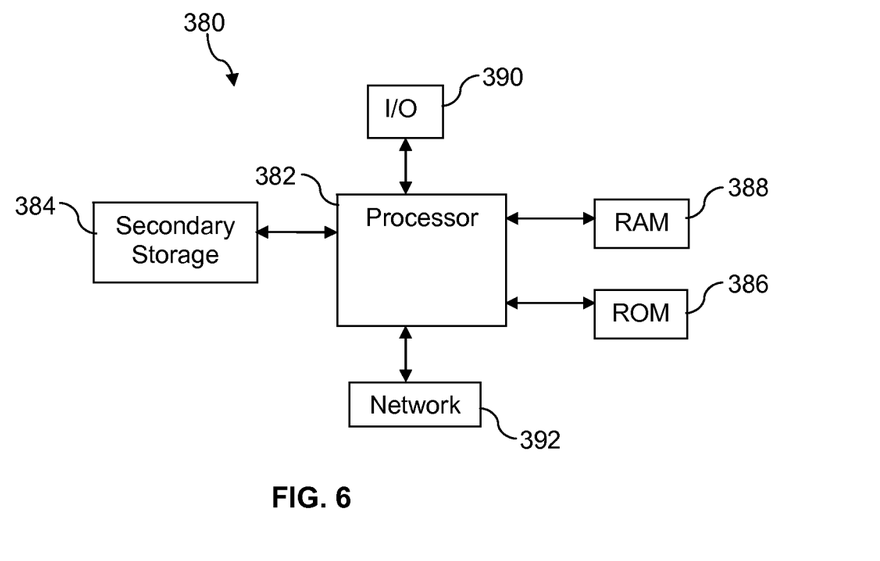
FIG. 6 is a block diagram of a computer system according to an embodiment of the disclosure.

FIG. 5 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 200. Also shown in FIG. 6 are a web browser application 608, a media player application 610, and JAVA applets 612, and the first context application 26. The web browser application 608 configures the mobile device 200 to operate as a web browser, allowing a user to enter information into forms and select links to retrieve and view web pages. The media player application 610 configures the mobile device 200 to retrieve and play audio or audiovisual media. The JAVA applets 612 configure the mobile device 200 to provide games, utilities, and other functionality.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in may other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device, comprising:
   a radio transceiver;
   a processor;
   a user interface;
   a memory; and
   an application stored in the memory that, when executed by the processor,
      sends a chat message via the radio transceiver identifying a problem with the portable electronic device, wherein the chat message is presented to the user interface;
      receives a request for information associated with the portable electronic device;
      sends the information associated with the portable electronic device via the radio transceiver; and
      receives a command, based on the information associated with the portable electronic device, to change configuration on the portable electronic device;
      wherein the information associated with the portable electronic device and the command are sent and received without being presented to the user interface and occur in the background;
      wherein the information associated with the portable electronic device comprises one of a version identity of a preferred roaming list (PRL) stored on the portable electronic device, an identity of a firmware version installed on the portable electronic device, an identity of the portable electronic device model, and a mobile equipment identity (MEID) of the portable electronic device.

2. The portable electronic device of claim 1, wherein the application sends the chat message via a first communication channel and wherein the application establishes a second communication channel and receives the command to change configuration via the radio transceiver on the second communication channel.

3. The portable electronic device of claim 1, wherein the application sends the chat message via a first communication channel and receives the command to change configuration via the radio transceiver on the first communication channel.

4. The portable electronic device of claim 1, wherein the information associated with the portable electronic device further comprises a list of applications executing on the portable electronic device.

5. The portable electronic device of claim 1, wherein the application receives a request from a remote computer for authority to remotely execute commands on the portable electronic device and transmits authority to remotely execute commands on the portable electronic device to the remote computer via the radio transceiver.

6. The portable electronic device of claim 1, wherein the application receives a request to turn off at least one hardware device of the portable electronic device and turns off the at least one hardware device of the portable electronic device.

7. The portable electronic device of claim 1, wherein the portable electronic device is one of a mobile phone, a personal digital assistant, and a media player.

8. A system, comprising:
   a processor;
   a memory; and
   an application stored in the memory that, when executed by the processor,
      receives, via a first communication channel, a first chat message identifying a problem with a portable electronic device, wherein the first chat message is presented to a user interface associated with the portable electronic device,
      in response to the first chat message, sends to the portable electronic device via a second communication channel, a request for information associated with the portable electronic device,
      receives, from the portable electronic device via the second communication channel, the information associated with the portable electronic device,
      wherein the information associated with the portable electronic device comprises at least one of a version identity of a preferred roaming list (PRL) stored on the portable electronic device, an identity of a firmware version installed on the portable electronic device, an identity of the portable electronic device model, and a mobile equipment identity (MEID) of the portable electronic device, and
      based on the received information associated with the portable electronic device, sends to the portable electronic device via the second communication channel, at least one command to fix the problem with the portable electronic device,
      wherein the information associated with the portable electronic device and the at least one command are sent and received via the second communication channel without being presented to the user interface and occur in the background.

9. The system of claim 8, wherein the application sends a request to the portable electronic device for authorization to remotely execute commands on the portable electronic device.

10. The system of claim 9, wherein the application executes a remote command on the portable electronic device to turn off a hardware device on the portable electronic device.

11. The system of claim 9, wherein the application executes a remote command on the portable electronic device to shut down an application executing on the portable electronic device.

12. The system of claim 8, wherein after sending the at least one command to the portable electronic device to fix the problem, the application sends a request to the portable electronic device for data and validates that the problem has been fixed based on the data.

13. The system of claim 8, wherein the application sends a plurality of requests to the portable electronic device to present to the user interface messages for leading a user of the portable electronic device through a sequence of corrective actions.

14. The system of claim 8, wherein the application stores the first chat message, stores the information associated with the portable electronic device received from the portable electronic device, and stores the at least one command sent by the application to the portable electronic device in the memory.

15. The system of claim 14, wherein the application receives a second chat message identifying a problem with the portable electronic device, receives additional information associated with the portable electronic device from the portable electronic device, and based on the additional information, based on the stored first chat message, based on the stored information, and based on the stored at least one command sends a second at least one command to the portable electronic device to fix the problem with the portable electronic device.

16. A method of communicating, comprising:
receiving a first chat message identifying a portable electronic device and a problem with the portable electronic device, wherein the first chat message is presented to a user interface associated with the portable electronic device;
sending to the portable electronic device a request for information associated with the portable electronic device,
receiving from the portable electronic device the information associated with the portable electronic device,
wherein the information associated with the portable electronic device comprises at least one of a version identity of a preferred roaming list (PRL) stored on the portable electronic device, an identity of a firmware version installed on the portable electronic device, an identity of the portable electronic device model, and a mobile equipment identity (MEID) of the portable electronic device, and
based on the information associated with the portable electronic device, sending a first at least one command to the portable electronic device to fix the problem with the portable electronic device,
wherein the information associated with the portable electronic device and the command are sent and received without being presented to the user interface and occur in the background.

17. The method of claim 16, wherein sending the first at least one command to the portable electronic device comprises at least one of sending a firmware update and sending a preferred roaming list (PRL) update to the portable electronic device.

18. The method of claim 16, further comprising storing the first chat message received from the portable electronic device, storing the information received from the portable electronic device, and storing the first at least one command sent to the portable electronic device.

19. The method of claim 18, further comprising
receiving a second chat message identifying the portable electronic device and a problem with the portable electronic device;
requesting additional information associated with the portable electronic device from the portable electronic device;
receiving the additional information associated with the portable electronic device from the portable electronic device; and
based on the additional information, based on the stored first chat message, based on the stored information, and based on the stored first at least one command, sending a second at least one command to the portable electronic device to fix the problem with the portable electronic device.

20. The method of claim 16, further comprising:
after sending the first at least one command, requesting fix validation data from the portable electronic device;
receiving the fix validation data from the portable electronic device; and
based on the fix validation data, validating the correction with the problem of the portable electronic device.

* * * * *